(No Model.) 7 Sheets—Sheet 1.
J. T. HAWKINS.
CHROMATIC PRINTING MACHINE.
No. 338,666. Patented Mar. 23, 1886.
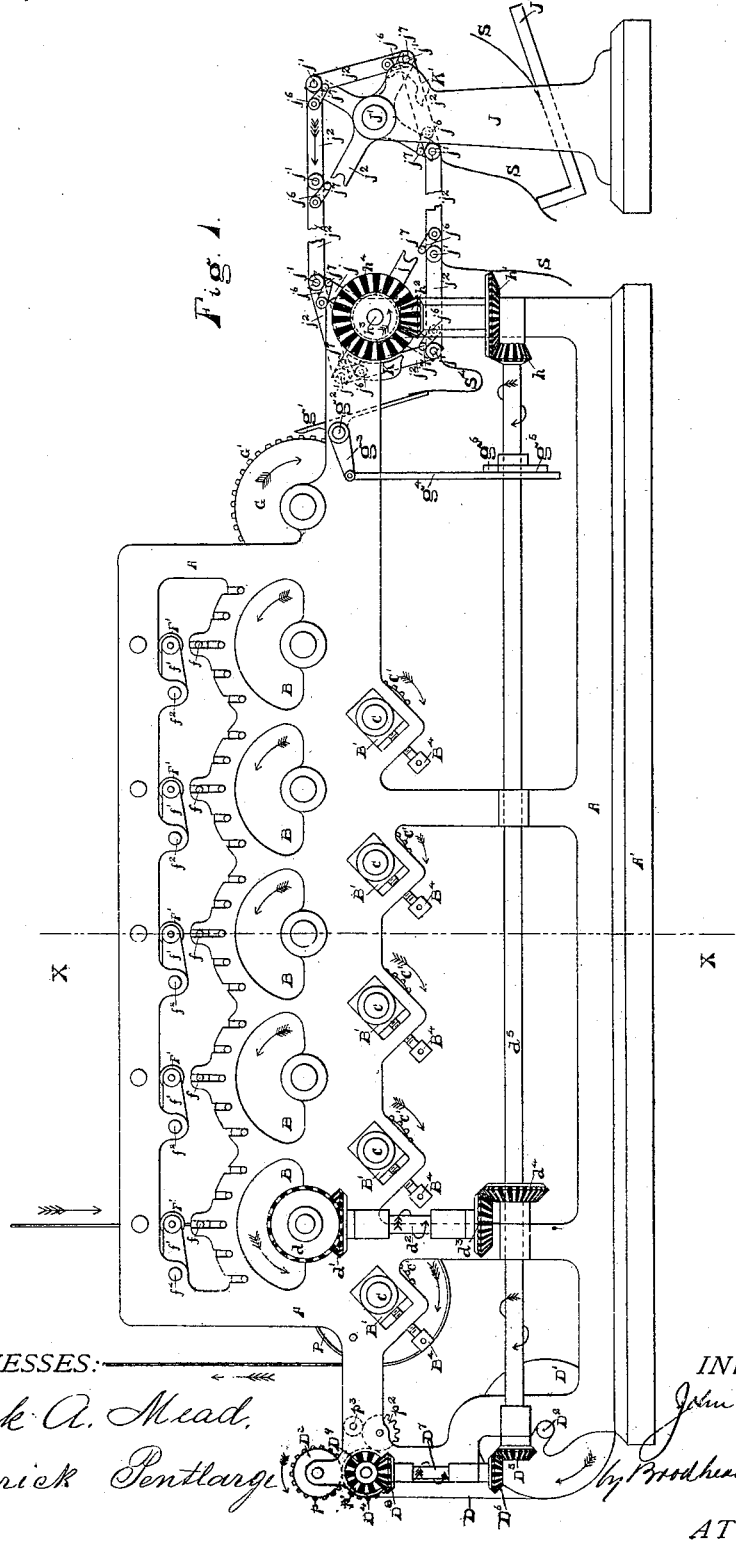
WITNESSES:
Frank A. Mead.
Frederick Pentlarge.
INVENTOR
John T. Hawkins
By Brodhead, King & Voorhees
ATTORNEYS.

(No Model.) 7 Sheets—Sheet 2.
J. T. HAWKINS.
CHROMATIC PRINTING MACHINE.
No. 338,666. Patented Mar. 23, 1886.
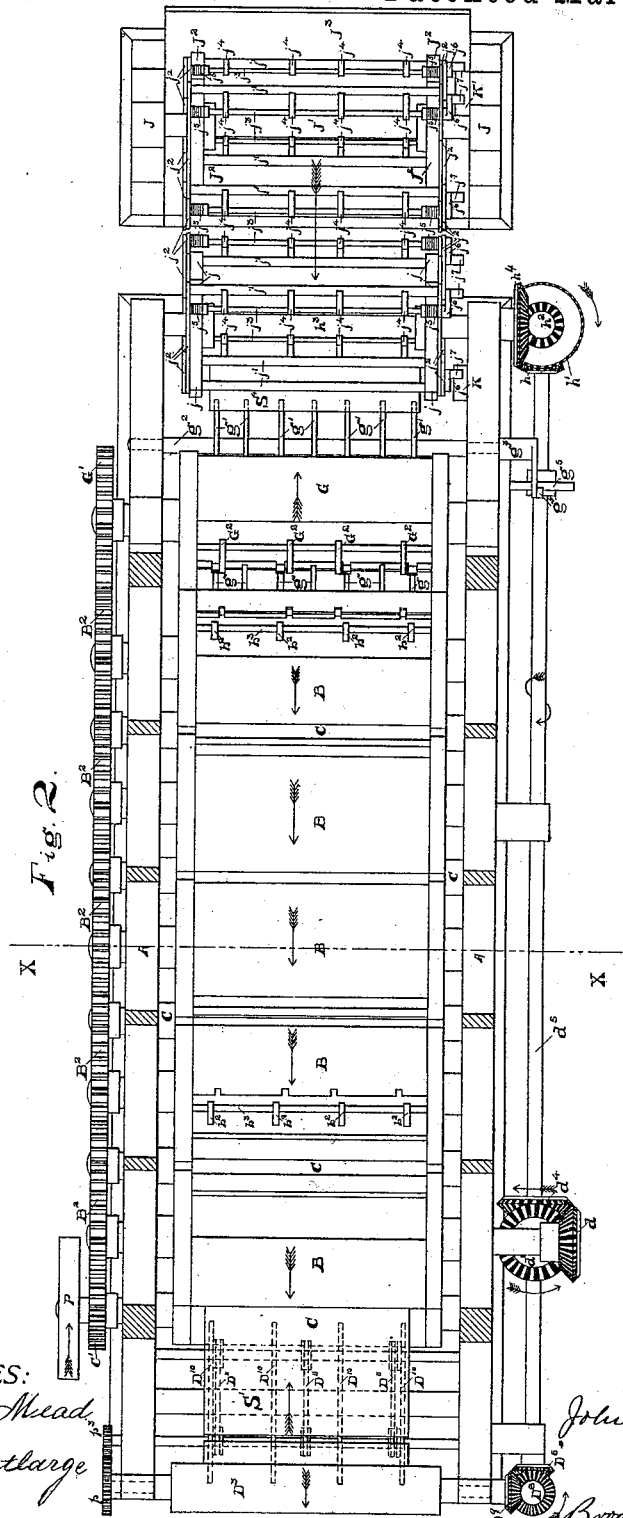
WITNESSES:
Frank A. Mead
Frederick Pentlarge
INVENTOR
John T. Hawkins
by Brodhead, King & Voorhees
ATTORNEYS

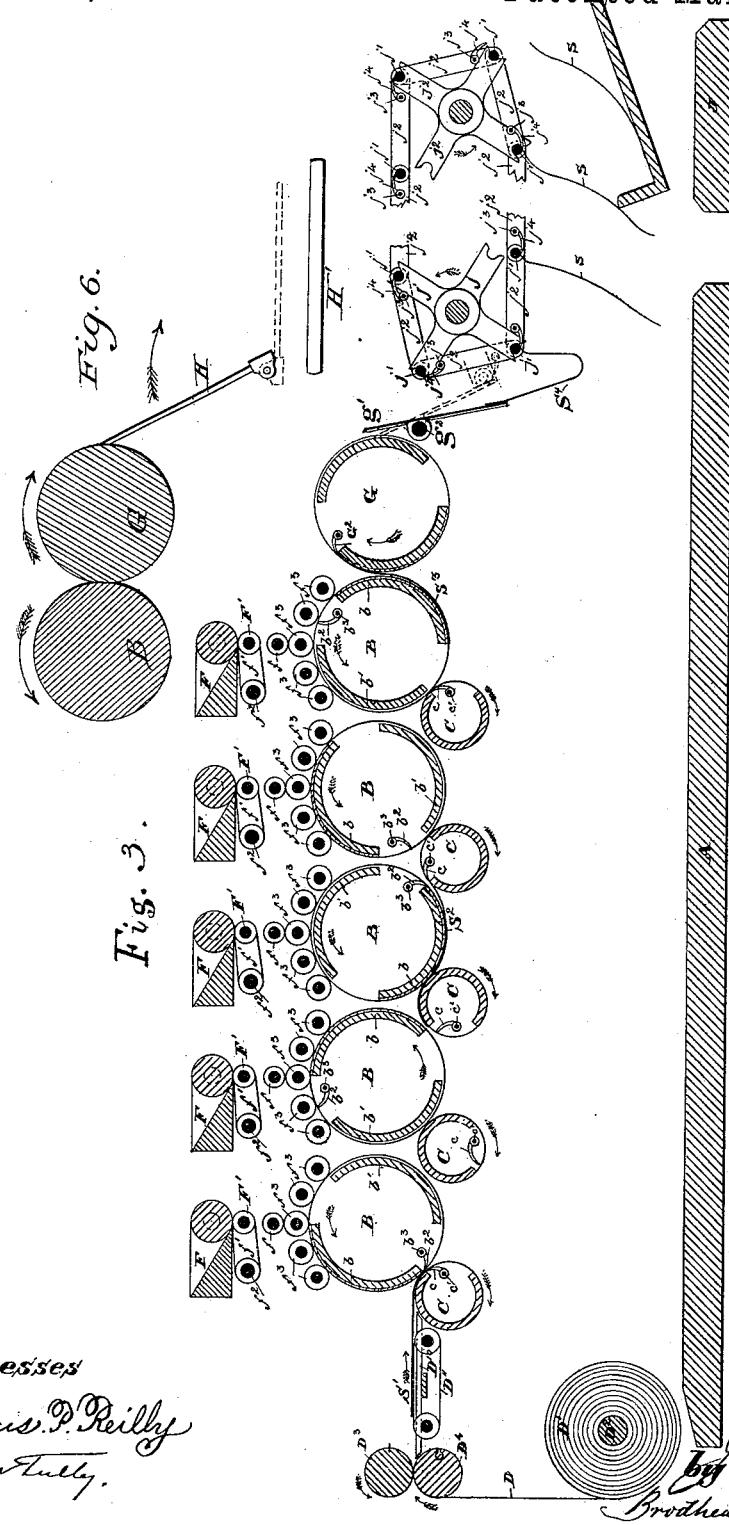

(No Model.)
7 Sheets—Sheet 4.
J. T. HAWKINS.
CHROMATIC PRINTING MACHINE.
No. 338,666. Patented Mar. 23, 1886.
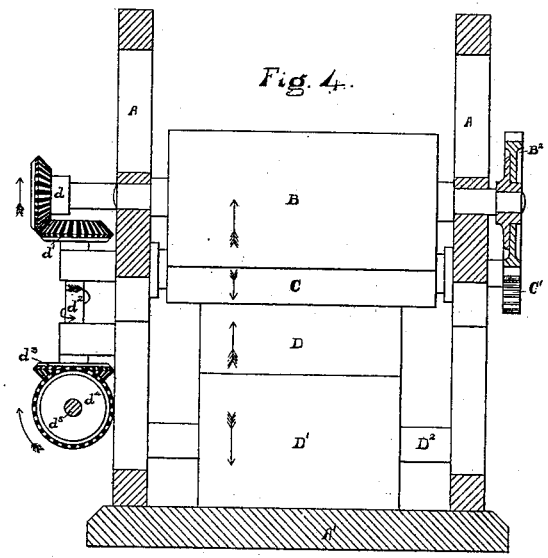
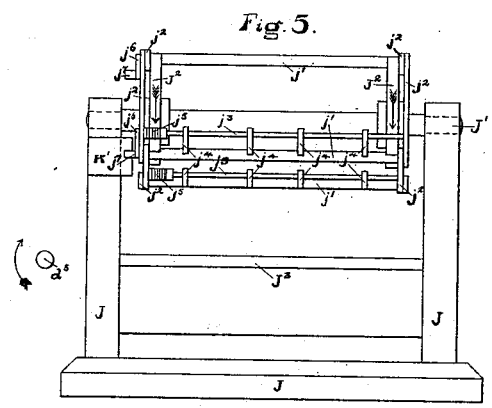
WITNESSES:
Frank A. Mead.
Frederick Pentlarge
INVENTOR
John T. Hawkins
G. Brodhead, King & Voorhees
ATTORNEYS (No Model.)
J. T. HAWKINS.
CHROMATIC PRINTING MACHINE.
No. 338,666.  Patented Mar. 23, 1886.
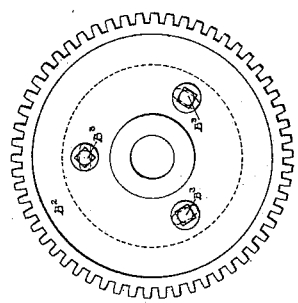
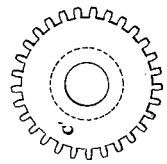
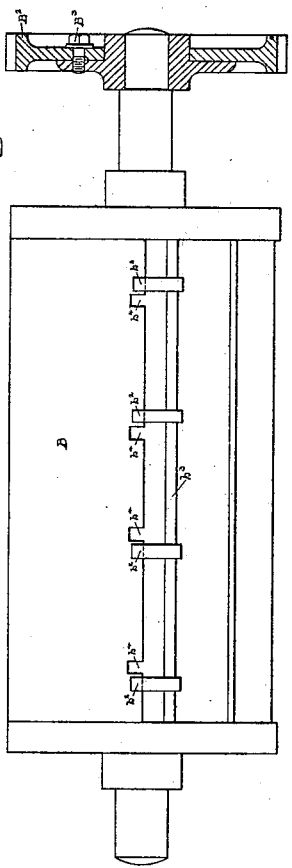
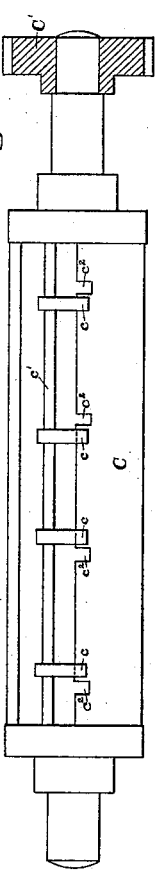
Fig. 7.  Fig. 8.
WITNESSES:
Frank A. Mead
Frederick Pentlarge
INVENTOR.
John T. Hawkins
Brodhead, King & Voorhees
ATTORNEYS

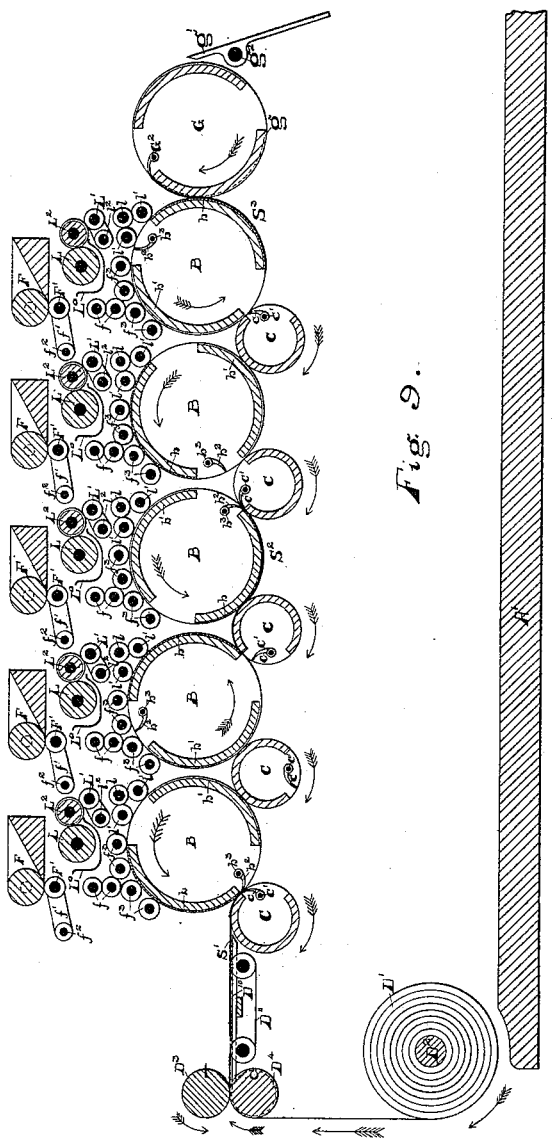

(No Model.)
7 Sheets—Sheet 7.
J. T. HAWKINS.
CHROMATIC PRINTING MACHINE.
No. 338,666. Patented Mar. 23, 1886.
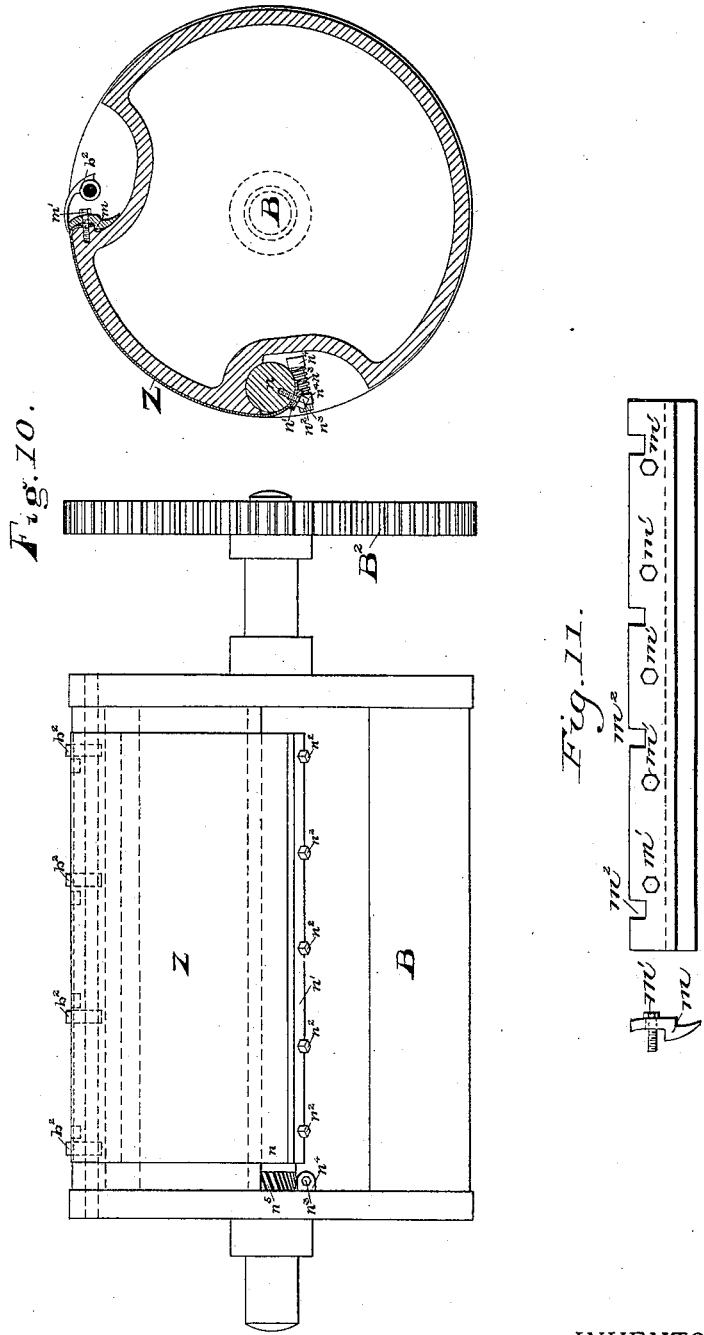
WITNESSES:
Frank A. Mead,
Frederick Pentlarge
INVENTOR
John T. Hawkins
Brodhead, King & Voorhees
ATTORNEYS,

UNITED STATES PATENT OFFICE.

JOHN T. HAWKINS, OF TAUNTON, MASSACHUSETTS.

CHROMATIC-PRINTING MACHINE.

SPECIFICATION forming part of Letters Patent No. 338,666, dated March 23, 1886.

Application filed March 22, 1883. Serial No. 89,084. (No model.)

*To all whom it may concern:*

Be it known that I, JOHN T. HAWKINS, of Taunton, in the county of Bristol and State of Massachusetts, have invented a new and useful Improvement in Chromatic-Printing Machines, which improvement is fully set forth and illustrated in the following specification and accompanying drawings.

The object of this invention is to print multicolored and other work from either stereotype, electrotype, or similar plates, or by the zincographic process, and to adapt the same general type of machine therefor to print either from a continuous web of paper at a rapid rate, cutting the sheets from the web before printing, and printing successively as many colors, or impressions of one color, as the machine may be arranged to print, or to print from separate sheets fed from a feed-board, in either case with perfect register of the different impressions and with provision for the delivery of the sheets in a pile clean and dried, or, in the former case, upon drying-trays, if so desired.

To this end the invention consists of a machine provided with cutting and feeding cylinders, and with a series of pairs of plate or form cylinders and impression-cylinders, as many of each of said pairs in series as there are colors employed when the sheet is perfected in multicolor at one feeding from the roll; but when but one impression or color is to be imparted at one only of several feedings the machine may be modified so as to be arranged with an ordinary feed-board and with but a single form or plate cylinder and impression-cylinder, from which board each sheet is fed through between said cylinders as often as required for its several impressions, said form-cylinder for multicolor work being provided with as many separate plates of zinc as there are colors used, and said plates in either form of machine being provided with suitable dampening apparatus, as is required in lithographic printing. In either modification of the machine each sheet is delivered so that its printed side shall come in contact with no part of the machine during its delivery.

In the accompanying drawings, Figure 1 is a side elevation of the machine self-feeding from the web or roll. Fig. 2 is a plan of the same, with the inking apparatus removed, the more clearly to show the plate-cylinders. Fig. 3 is a longitudinal vertical section through Fig. 1, omitting the frames and driving mechanism for clearness of illustration. Fig. 4 is a transverse vertical section at lines $x\,x$, Figs. 1, 2, and 3, the inking apparatus being omitted. Fig. 5 is an end elevation of the delivery mechanism as arranged in Figs. 1, 2, and 3. Figs. 1, 2, and 3 show the machine as arranged to convey the printed sheets suspended vertically by their upper edges or heads to any desired distance, for the purpose of drying them, and then depositing them upon a delivery-board in a pile. Fig. 6 shows an ordinary fly delivering the sheets in a pile on a fly-board in the ordinary way, instead of the stripper-fingers shown in Fig. 3. Figs. 7 and 8 are enlarged views of the form and impression cylinders, showing the details of the grippers and gripper-gaps, together with the means employed to adjust the form-cylinders to register with each other in that form of the machine constructed in series for multicolor printing. Fig. 9 is a sectional elevation, similar to Fig. 3, of the machine as arranged in series and adapted to mulicolor printing by the zincographic process, having for each pair of cylinders a dampening apparatus in advance of the inking apparatus. Fig. 10 shows in two views a longitudinal elevation and transverse section of the plate or form cylinder as adapted to zincographic printing, showing the method of securing the sheet of zinc or other metal to the cylinder. Fig. 11 shows in two views the bar for clamping the head end of the plate or sheet of zinc to the cylinder as arranged for zincographic work.

Referring to Figs. 1 to 9, inclusive, the letter A indicates the main frames, and A' the bed-piece, of the machine; B B, a series of cylinders journaled in frames A, carrying the plates or forms to be printed from upon a portion of their circumferences, as at $b\,b$, Fig. 3, the remainder being ink-distributing surface, as at $b'\,b'$, which is formed at a shorter radius to clear the impression-cylinders, and two gaps, in one of which gaps is a series of grippers, $b^2$, upon suitable gripper-shafts, $b^3$, journaled in cylinders B. The cylinders B all revolve in one direction, and have each secured to its axis a spur-gear, B², said gears not touching each other, (the cylinders B having sufficient space between them,) and being made in two parts secured together by bolts and slots, as shown at B³, Fig. 7, to allow of adjusting the cylinders for register within the limits of one tooth of gears B², the central parts or hubs being keyed to the axis of cylinders B. In adjustable journal-boxes B', carried in frames A, are journaled a series of impression-cylinders, C, each carrying a series of grippers, c, upon a gripper-shaft, c', in a single gap. Upon the axis of each impression-cylinder C is secured a spur-wheel, C', the first of which engages the first gear-wheel B² of the first of the plate or form cylinders B, all the others engaging the gears B² of the two adjoining plate or form cylinders B. The cylinders B C are shown having diameters two to one, and the gears B² C' are in the same proportion; but these may be made of any other proportion to suit the work designed to be done, the printing portions of the peripheries of cylinders B and impression portions of peripheries of cylinders C being properly proportioned to suit. The cylinders B and C are so set with reference to each other that the second cylinder C does not touch the first cylinder B, and similarly the third, fourth, and fifth cylinders C do not touch the second, third, and fourth cylinders B. The first, second, third, fourth, and fifth cylinders C therefore make contact only with the first, second, third, fourth, and fifth cylinders B, respectively, so that each cylinder B receives a pressure only at the point of contact of its corresponding cylinder C, as graduated by the adjusting-screws B⁴, and at which point the printing for each color or impression is performed. The whole machine is actuated from the shaft of the first cylinder C by means of pulleys P, Figs. 1 and 2, or by any suitable gearing.

The cylinders B, as before stated, carry a series of grippers, b². Said grippers are so set as to clear the grippers c of the cylinders C, and in the gripper edge of the plate or form cylinder B are cut recesses b⁴, corresponding in lateral position with the grippers c of the impression-cylinders C, and in the gripper edge of the cylinders C are cut similar recesses, c², corresponding in lateral position with the grippers b² of the cylinders B, so that when the grippers of a pair of cylinders may meet upon the same line for transferring the sheet from one to the other, as shown, with first cylinders B and C as a pair, and third cylinder B and fourth cylinder C as a pair, Fig. 3, the grippers of each cylinder B or C may open or close through the corresponding recesses in the gripper edge of the opposite cylinder of the pair. In this way the sheet may be transferred in a positive manner from one cylinder to the other with absolutely correct register.

The gripper opening and closing mechanism has not been shown, as this operation may be accomplished in many well-known ways—as, for instance, by stationary cams upon the frames and arms and rollers on the gripper-shafts, as is shown in the endless-chain delivery apparatus, Figs. 1 and 2, at K and K'.

F F indicate a series of ink-fountains of the usual form, one to each plate or form cylinder B.

F' F' indicate ductor-rollers for conveying ink from the fountain-roller to the distributing or intermediate rollers, $ff$, the rollers F' F' being carried in arms $f'f'$, secured to rock-shafts $f^2 f^2$, which may be actuated in any of the well-known ways. The center one of the form-rollers $f^3 f^3$ receives the ink direct from the distributing-rollers $ff$, and from the distributing-surface of the plate-cylinders, said form-rollers being lifted to the proper height to meet the form as it passes under them and dropped again to meet the lower distributing-surface of the plate-cylinders B by suitable cams attached to the cylinders B and rollers or wheels on the ends of their axes, as well known in the art, and therefore omitted from the drawings.

The web of paper D is carried in a roll, D', upon a suitable axis, D², journaled in the frames A.

D³ D⁴ indicate a pair of cutting-cylinders, and D¹⁰ D¹¹ a series of conveying-tapes and bridge-fingers, similar to those described in Patent No. 257,581, granted to me May 9, 1882.

G indicates a delivery-cylinder carrying a set of grippers, G², and having its periphery provided with a series of circumferential depressions or grooves, $g$, as seen in Figs. 2 and 3, turned in its surface to allow the entrance of the points of a series of strippers, $g'$. The cylinder G is geared directly to the last plate or form cylinder B by the gear-wheel G'. The grippers of cylinder G are operated in the same way as described for the other cylinders, or in any well-known way, so as to receive the sheet from the last plate or form cylinder B, and release it at the time that it enters upon the strippers $g'$. The cylinder G is made of sufficient diameter to insure that its grippers G² shall retain their hold upon the sheet until the last or tail end of a full sheet shall be unwound from contact with the form or plate of the last plate or form cylinder B, as otherwise the adhesion of the paper to the form might carry it backward before it would be fully delivered upon the cylinder G. In this case it has the same diameter as the cylinders B. This precaution is not necessary with the small impression-cylinders C, as the sheet is transferred from one set of grippers to another throughout its progress through the machine, and is therefore forcibly unwound from each form in succession, the sheet always being held at its head by some one of the sets of grippers in either the plate or form cylinders B or the impression-cylinder C until taken by the last series of grippers G² of cylinders G. The strippers $g'$ are secured to a rock-shaft, $g^2$, upon one end of which is secured an arm, $g^3$, actuated through the connecting-rod $g^4$, bifurcated over shaft $d^5$ by a cam, $g^5$, as hereinafter shown.

Upon the the axis of the first plate or form cylinder B is secured a bevel-wheel, $d$, engaging another bevel-wheel, $d'$, secured upon the upper end of a vertical shaft, $d^2$, suitably journaled in projections from one of the frames A. Upon the lower end of the vertical shaft $d^2$ is secured another bevel-wheel, $d^3$, engaging a fourth wheel, $d^4$, secured to a horizontal shaft, $d^5$, the bevel-wheels $d$ $d'$ $d^3$ $d^4$ being equal, so as to impart to shaft $d^5$ equal revolutions with the first plate or form cylinder B. Upon the left-hand end of the shaft $d^5$, Fig. 1, is secured a bevel-wheel $D^5$, engaging an equal wheel, $D^6$, upon a vertical shaft, $D^7$, journaled in projections from one of the frames A, and on the upper end of the shaft $D^7$ is secured another bevel-wheel, $D^8$, engaging an equal bevel-wheel, $D^9$, secured to the axis of the cutting-cylinder $D^4$, the latter series of gears serving to impart motion to the cutting-cylinders $D^3$ $D^4$, said cylinders being geared together by gears $p$ $p'$, and the latter giving motion to the tapes $D^{11}$ through an intermediate gear, $p^2$, and a gear, $p^3$, upon the axis of the adjoining tape-pulley shaft.

Referring now to Figs. 1, 2, and 3, upon the shaft $d^5$ is secured the cam $g^5$, which is of proper shape to oscillate (by means of the roller $g^6$, secured to the connecting-rod $g^4$) the strippers to the two positions shown in full and dotted lines, Fig. 3, at each revolution of the delivery-cylinder G. Upon the right-hand end of the shaft $d^5$, Fig. 1, is secured a bevel-wheel, $h$. Upon a short vertical shaft journaled in projections from one of the frames A are secured bevel-wheels $h'$ $h^2$. Upon a shaft, $h^3$, journaled in frames A, is secured a bevel-wheel, $h^4$, which engages the bevel-wheel $h^2$. Upon the shaft $h^3$ are secured two or more sprocket-spiders, $j$, having four or more arms, each of suitable form on the ends to engage a series of rods, $j'$. In a suitable stand, J, is carried a shaft, J', carrying a second set of sprocket-spiders, $J^2$, also engaging the rods $j'$. The rods $j'$ are journaled in a series of links, $j^2$, and together with links $j^2$ form an endless chain. The stand J, with its sprockets $J^2$, may be set at any suitable distance from the shaft $h^3$, carrying sprockets $j$, as may be thought desirable to enable the sheets to be carried a sufficient distance to become dried before piling upon the receiving-board $J^3$, attached to the stand J, the proper number of links $j^2$, rods $j'$, &c., being made up for that purpose. Journaled in the links $j^2$ are a series of gripper-rods, $j^3$, each carrying a series of grippers, $j^4$, closing upon the rods $j'$ by means of the springs $j^5$, and on one end of each of the gripper-rods $j^3$ are secured levers $j^6$, each carrying a roller, $j^7$. To one of the frames A is secured a stationary cam, K, and to stand J a similar cam, K', which engage at the proper times the rollers $j^7$, for opening and closing successively the grippers $j^4$. The speed of the shaft $h^3$ and of its sprockets $j$ is so proportioned by means of the bevel-wheels $h$, $h'$, $h^2$, and $h^4$ that one arm of the sprocket $j$, and consequently one set of grippers $j^4$, shall pass to position for grasping the issuing sheet for every revolution of the plate or form cylinder B or delivery-cylinder G, thus traveling much slower than the sheet travels down the strippers $g'$ at the time that the grippers $j^4$ seize it. S S show the separate sheets, after being completely printed, as being held by grippers $j^4$, vertically suspended by their leading ends or heads. S' shows a sheet just entering to first impression between the first plate or form cylinder B and its corresponding impression-cylinder C. $S^2$ shows a sheet in position as just being taken from the third plate or form cylinder B by the grippers of the fourth impression-cylinder C, while a portion of the last end is still receiving the third impression between the third plate or form cylinder B and the third impression-cylinder C. $S^3$ shows a sheet in progress of being carried over to the strippers $g'$, as held by the grippers of delivery-cylinder G, after having received its fifth impression, but before the whole sheet has been rolled off the last plate-cylinder B by the delivery-cylinder G. $S^4$ shows a sheet in position as held by one set of grippers $j^4$, with the strippers $g'$, oscillated out of the way to allow its tail end to loop and drop into the vertical position, as shown in Figs. 1 and 3.

In Fig. 6 is illustrated the application of the ordinary oscillating fly to the delivery of the sheets from the cylinder G, printed side down, when such method may be desirable, in such case the fly-fingers H taking the place of the strippers $g'$, Figs. 1, 2, and 3, and the fly-board H' the place of the receiving-board $J^3$. Referring now to Fig. 9, $L^0$ is a series of water-fountains; L, a series of water-fountain rollers; $L^2$, a series of stationary water-ductor rollers; L', a series of moving water-ductor rollers carried in arms attached to the rock-shaft $l^2$. The letter $l$ indicates a series of water-distributing rollers, and $l'$ a series of water-form rollers, the latter, by proper means, being prevented from dropping into contact with the distributing-surface of the plate or form cylinder B, this surface being constructed on a shorter radius than the plate or form surface. With this construction, and the plate or form cylinder B constructed as hereinafter described for Figs. 10 and 11, this machine becomes adapted to multicolor work by the zincographic process.

In Figs. 10 and 11, Z indicates the zinc plate or sheet secured to part of the periphery of the cylinder B, by means of the clamp $m$ and bolts $m'$, at the head or gripper end of the form, and also by means of the roller $n$, to which it is clamped by the clamps $n'$ and bolts $n^2$. The roller $n$ is journaled in the cylinder at its ends, and is embedded for a part of its circumference throughout its whole length in the cylinder B to prevent its springing when under strain. To the roller $n$, at one end, is secured the worm-wheel $n^5$, into which meshes the endless screw $n^3$, carried in lugs or bearings $n^4$. The roller $n$ is rotated by means of the endless screw $n^3$ to strain the plate or sheet of zinc securely in contact with the surface of the cylinder B. The clamp $m$ has slots $m^2$ cut in its outer edge (which edge forms a short continuation of the cylindrical surface of the plate or sheet of zinc Z) corresponding in lateral position with the grippers of the cylinder C and the delivery-wheels G', so that either of the latter in opening or closing passes through the slots $m^2$, while the zinc plate Z is not cut for their passage. The sheets are clamped by their leading unprinted margins upon the top of the clamp $m$ by the grippers $b^2$ of the cylinder B at points between the slots $m^2$.

I do not confine myself to the use of worm-gearing for operating the roller $n$, as a ratchet or any other suitable mechanical device may be substituted for worm-gearing without changing the essence or substance of my invention.

The operation of the machine as arranged in Figs. 1, 2, 3, and 9 is as follows: The sheet D passes from the roll D' to and between the cutting-cylinders $D^3$ $D^4$, and is conveyed by the tapes $D^{11}$ to the grippers $c$ of the first impression-cylinder C. Simultaneously with the severing of the sheet by the knives of the cutting-cylinders $D^3$ and $D^4$ these grippers close upon its leading margin or edge. It is then carried through the process of receiving its first impression between the first pair of cylinders B and C. Upon the arrival of the head of sheet S' at the point of contact of the first pair of cylinders B and C the grippers $c$ of the first impression-cylinder C release it simultaneously with its being grasped by the grippers $b^2$ of the first plate or form cylinder B, which thereafter hold it until carried to the point of nearest approach between the second impression-cylinder C and the first plate or form cylinder B, when simultaneously the grippers $b^2$ of the first cylinder B open and the grippers $c$ of the second cylinder C close, which latter further carry it to the point of contact of the second cylinder C and the second cylinder B, when the grippers simultaneously open and close, delivering the sheet to the grasp of the grippers $b^2$ of the second cylinder B, after which it receives its second impression between the second pair of cylinders C and B, and in this way it is transferred from cylinder to cylinder, receiving as many impressions as there are plate or form cylinders in the machine, until taken by the grippers $G^2$ of the cylinder G, the latter carrying it until its head reaches the points of the strippers $g'$ embedded in the grooves $g$ of the cylinder G, at which point the grippers $G^2$ release it and it passes down the strippers $g'$ until it overtakes the open grippers $j^4$, moving in the same direction at a slower rate. At this point the grippers $j^4$ are closed upon it by the action of the cam K, and simultaneously the cam $g^5$ oscillates the strippers $g'$ into the position shown in full lines in Figs. 1 and 3, while the grippers $j^4$ are at the same time moving away from the strippers $g'$, and allow the tail of the sheet to loop, as shown at $S^4$, Fig. 3, and finally to be successively suspended vertically, as at S S S. The endless chain of grippers illustrated in Figs. 1 and 3 may be made as long as may be necessary to convey the sheets thus suspended over hot-air pipes or other drying devices, and at the end of such chains of suspended sheets the grippers $j^4$ are successively opened by the cam K', allowing them to drop successively in a pile on the receiving-board $J^3$; but this means of delivery I do not herein claim, reserving the same for another application for Letters Patent, which said Letters Patent have issued since the filing of this application, dated July 28, 1885, and numbered 323,329.

For multicolor work the fountains F are each filled with a separate color, and the cylinders B supplied with the plates or blocks to print the colors therefrom. In this way numerous colors may be printed at a rapid rate, dried, and deposited, as described, perfect register being assured by the sheets being never released from one set of grippers until secured by the succeeding set throughout the entire number of impressions.

The operations of delivering the sheets when arranged, as indicated in Fig. 6, for printing such classes of work as do not involve heavy colors, and consequent liability to offset from one sheet to the other in the pile, has already been sufficiently described. In all these operations of delivering the sheet it will be seen that the printed side escapes contact with any part of the mechanism throughout the entire process of delivery, and that in all cases, except as shown in Fig. 6, the sheets are laid printed side up, so as to be under inspection at all times until covered by the delivery of a succeeding sheet.

As the impression-cylinders C are but one-half the diameter of the form-cylinders B, they take a sheet only at each second revolution, the grippers $c$ opening upon their non-receiving revolution into the unoccupied gap on the side opposite the grippers $b^2$ of the form-cylinders B, as seen at the juncture of the third impression-cylinder C and the second form-cylinder B, Fig. 3, and the cutting-cylinders $D^3$ $D^4$, are so speeded as to have a surface velocity of one-half that of the cylinders C, thus feeding a sheet to the first impression-cylinder C at every second revolution. This construction permits of the sheets being in advance of each other in their passage through the machine more than their own length, or equal to the full circumference of the impression-cylinder C, and thus give ample time for the operation of the delivery mechanism between the arrival of the successive finished sheets.

Although most available for multicolor printing, this machine is by no means confined to this class of printing; but may be arranged with two or more pairs of cylinders for the production of illustrated periodical printing in one color, where cuts and type may be so juxtaposed in one form as to require great disparity in the amount of ink to be distributed upon the several parts of the form—as, for instance, printing very light shading and flat black silhouettes on the same page, which it has heretofore been found to be very difficult to achieve at one impression. When arranged for such classes of work, those parts of such forms as require to be in very fine shades may be confined to one cylinder, inked and supplied from its own fountain and inking apparatus, and the heavier work to the other; and, if desirable to combine one or more colors on the same page of such a piece of work, these colors may be added by successive pairs of cylinders B and C. For printing illustrated work of this kind on both sides, the less important side may be run off at high speed from the web, and the machine so constructed as to be capable of being changed to be fed from separate sheets (as shown in Patent No. 257,581, granted to me May 9, 1882) for the more important mixture of cuts, type, &c., the whole producing such illustrated work at an average speed very far ahead of the present cylinder-press with reciprocating type-bed in any of its forms.

No claim is herein made to anything herein described and heretofore claimed in Patent No. 305,076, granted to me on the 16th day of September, 1884, consisting of a form-cylinder, an impression-cylinder, a delivery-cylinder, and a rotary gripper-frame, all carrying grippers for the transfer of the sheet from the one to the other.

It is obvious that the same transfer of sheet will be effected from the grippers of one cylinder to another, whether either cylinder be a form-cylinder or a plain delivery-cylinder, or an impression-cylinder as well as a delivery-cylinder.

Having thus fully described my said improvements as of my invention, I claim—

1. A printing-machine for making successive impressions upon one side of a sheet of paper, consisting of a series of successive plate or form cylinders, as B, and a series of successive impression-cylinders, as C, arranged so that the sheet is taken by the grippers of the first cylinder of one series, thence transferred to the first cylinder of the other series by the grippers thereof, and thereafter transferred alternately from the cylinder of one series to the cylinder of the other series by the grippers of the succeeding cylinder closing upon the advancing sheet simultaneously with its release by the grippers of the preceding cylinder, substantially as set forth.

2. In a printing-machine for printing successive impressions upon a sheet of paper by means of a series of successive pairs of impression and form cylinders, in combination with said series of cylinders, a circumferentially-grooved delivery-cylinder, and a series of oscillating stripper-fingers, said cylinder carrying a set of grippers to receive the sheet and remove it from contact with the last form-cylinder, and having sufficient diameter to retain its hold upon the sheet until said sheet is entirely rolled from the last form-cylinder before its release by said grippers and entrance upon said stripper-fingers for the purposes of further delivery, substantially as set forth.

3. In a printing-machine, a type or form cylinder, as B, having grippers, as $b^2$, and recesses, as $b^4$, in its gripper edge, in combination with an impression-cylinder, as C, having grippers, as $c$, and recesses, as $c^2$, in its gripper edge, whereby when said cylinders and grippers are actuated the grippers on the respective cylinders either close or open, as may be desired, through said recesses in the opposite cylinder, one set of grippers thereby seizing while the other set releases the sheet, which is thus delivered from impression-cylinder to type-cylinder, or vice versa, without disturbance of register, substantially as and for the purposes set forth.

4. In a machine for printing from a cylinder form or plate, a form-cylinder provided with end bearings for carrying the journals of a straining roller or shaft, and with a continuous intermediate bearing for supporting the remainder of said shaft, whereby provision is made for stretching or straining a sheet metal form-plate upon said cylinder, substantially as and for the purposes set forth.

JOHN T. HAWKINS.

Witnesses:
FRANK A. MEAD,
CHESTER C. HOWE.